(12) United States Patent
Pathak

(10) Patent No.: US 10,282,350 B1
(45) Date of Patent: May 7, 2019

(54) DATA STORE OPTIMIZER

(71) Applicant: Amazon Technologies, Inc., Reno, NV (US)

(72) Inventor: Rahul Sharma Pathak, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1085 days.

(21) Appl. No.: 13/924,271

(22) Filed: Jun. 21, 2013

(51) Int. Cl.
*G06F 16/22* (2019.01)
*G06F 16/21* (2019.01)
*G06F 16/2453* (2019.01)

(52) U.S. Cl.
CPC .......... *G06F 16/2282* (2019.01); *G06F 16/21* (2019.01); *G06F 16/2453* (2019.01)

(58) Field of Classification Search
CPC . G06F 17/30289; G06F 16/2282; G06F 16/21
See application file for complete search history.

(56) References Cited

U.S. PATENT DOCUMENTS

| | | | | |
|---|---|---|---|---|
| 7,590,641 B1* | 9/2009 | Olson | ............... | G06F 17/30595 |
| 7,984,043 B1* | 7/2011 | Waas | ............... | G06F 17/30932 |
| | | | | 707/718 |
| 2006/0085378 A1* | 4/2006 | Raizman | ........... | G06F 17/30312 |
| 2006/0085484 A1* | 4/2006 | Raizman | ........... | G06F 17/30336 |
| 2006/0253472 A1* | 11/2006 | Wasserman | ............ | G06Q 10/06 |
| 2009/0077016 A1* | 3/2009 | Belknap | ............ | G06F 17/30306 |
| 2010/0235335 A1* | 9/2010 | Heman | ............. | G06F 17/30345 |
| | | | | 707/703 |
| 2013/0297976 A1* | 11/2013 | McMillen | ............. | G06F 11/079 |
| | | | | 714/43 |
| 2014/0122827 A1* | 5/2014 | Kumar | ............. | G06F 17/30345 |
| | | | | 711/206 |

\* cited by examiner

*Primary Examiner* — Charles E Lu
(74) *Attorney, Agent, or Firm* — Thorpe North & Western, LLP.

(57) ABSTRACT

A method is described for monitoring data store performance and recommending a data store structure for a data store. The method may include analyzing a data store structure to determine whether the data store structure corresponds to a set of criteria, analyzing a query executed against the data store structure to determine performance of the query with respect to the data store structure and providing a proposed data store structure to a customer based at least in part on the analysis of the data store structure and analysis of the query.

19 Claims, 14 Drawing Sheets

DATA STORE OPTIMIZER

BACKGROUND

As technological capacity for organizations to create, track, and retain information grows, a variety of different technologies for managing and storing information have been developed. Distributed data store systems, for example, provide customers with many specialized or customized configurations of hardware and software to manage stored information. Data stored in a distributed data store may be distributed across multiple physical devices and/or physical locations that may be connected by a network, such as the Internet, intranets or extranets.

Distribution of data may improve performance of the data store for customers who may be located across a geographical area. The increasing amounts of data organizations may store and manage often may correspondingly increase both the size and complexity of data storage and management technologies, like distributed data store systems, which in turn escalate the cost of maintaining the information. New technologies seek to reduce both the complexity and storage infrastructure of maintaining data while simultaneously improving the availability of data storage and efficiency of data management.

Various technologies may be employed to design a distributed data store system that may be customized for the type of business that the distributed data store system supports. However, technologies that may optimize distributed data store performance may not be evident to customers who may lack experience with data management and data store system design. Where optimizing technologies are not used to improve efficiency and performance of a distributed data store system, the distributed data store may become increasingly less efficient as the size and complexity of the distributed data store system increases.

DETAILED DESCRIPTION

Figure 1:
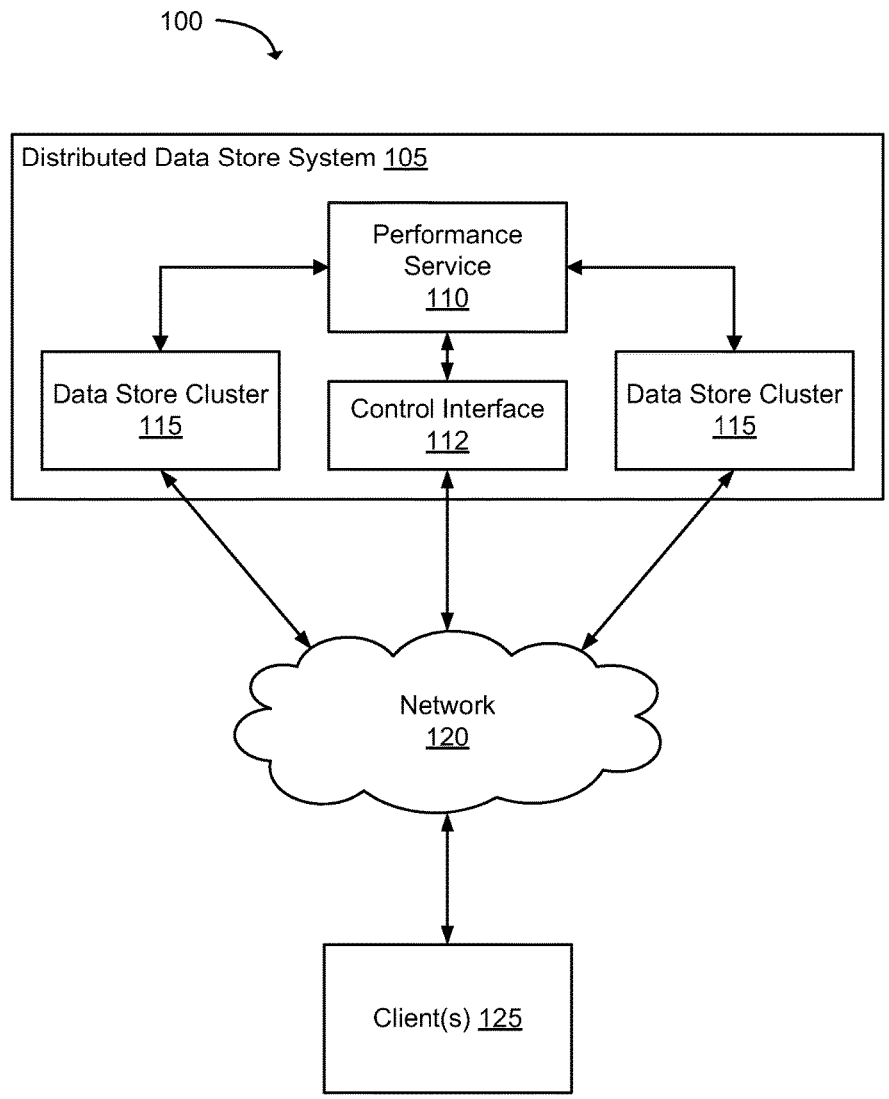
FIG. 1 is a diagram illustrating an example system for adaptively improving data store performance.

A technology is described for monitoring data store performance and recommending a data store structure for a data store. The term data store structure may refer to: the structure (e.g., columns, rows, tables, clusters and other nodes within the clusters) of a data store and the constraints (e.g., primary keys, sort keys and distribution keys) implemented within a data store. In one example configuration, the technology may analyze the data store structure for a data store based upon criteria to identify a proposed data store structure, that when applied to the data store may be considered to improve efficiency within the data store.

The technology may analyze queries that may be executed in the data store. The performance of the queries may be used to determine whether a data store structure may be efficiently configured in relation to the queries executed against the data store. Based upon the analysis of the data store structure and the queries executed on the data store, a proposed data store structure may be provided to a customer that may (if implemented) result in increased data store efficiency and performance.

The term "data store" as used herein may refer to a data storage system that is used for storing and organizing data in a computer. Examples of a data store may include a database, data warehouse, distributed database, centralized database, cloud database, columnar database, flat file, etc. It is understood that the present technology is not limited to any specific type of a data store, rather, any type of data store may benefit by implementing the present technology.

The present technology may assist organizations that employ a third-party to host a data store system, as well as organizations that host the organization's own data store system, by analyzing a data store system and providing proposed changes to a data store's structure that may enable the data store to perform better. Proposed changes may be determined and presented at various times during a data store system's lifecycle. For example, a first set of proposed changes may be provided after a customer has initially created and set up a data store system. The technology may analyze the data store system to determine whether the newly created data store complies with a predefined set of criteria. As a more specific example, a customer setting up a data store may create a number of data store tables. The criteria for data store table design may include the criteria for choosing a sort key, choosing a distribution key, defining table constraints, choosing the smallest possible column size, selecting a date/time data type for date columns, as well as other criteria that may improve data store performance.

Another set of proposed changes may be provided to a customer once the data store is being populated with data. Data ingested into the data store may be analyzed to determine whether table definitions for the data store correspond with the actual data being ingested into the data store. In a case where the table definition and the data being ingested into the data store do not correspond, a recommendation may be made to a customer to update the table definition.

Because a data store may evolve over time, a data store structure defined when a data store was first created may not be the best data store structure for the data store at a later date. Due to the evolving nature of data in a data store, the data store performance may degrade over time. The present technology may be used to prevent degradation of data store performance by monitoring changes and activity within the data store and providing proposed updates to the data store's structure. A customer may evaluate the proposed updates and then apply the updates to the data store. As a more specific example, queries executed against a data store may be analyzed to determine whether the data store structure is configured to increase query performance. In the event that a data store structure may not be configured to increase query performance, improvements to the data store structure may be recommended.

FIG. 1 is a diagram illustrating a high level example of a system 100 for adaptively optimizing data store performance. The ability of an organization to employ a third-party to host a data store system remotely has freed many organizations from the necessity of having to maintain and administer hardware associated with a data store system. Although an organization may not be responsible for hardware running the organization's data store, the organization may need someone with knowledge and experience to set up and maintain the data store structure associated with the organization's data store system. In some cases, an organization may lack someone within the organization with adequate knowledge to configure a data store hosted by a third-party so that the data store structure may perform more efficiently. Organizations that house and maintain the organization's own hardware may also lack a qualified individual able to fine tune the organization's data store structure to perform more efficiently. Even in the event that an expert individual exists to analyze and improve the data store efficiency, subtle optimizations can be subtle and time consuming to identify.

The system 100 may include one or more clients 125 that may be in communication with a distributed data store system 105 by way of a network 120. The distributed data store system 105 may include a number of data store clusters 115 and a performance service 110. A data store cluster 115 may include one or more nodes on which storage may be distributed. The data store clusters 115 may respond to customer requests (e.g., to write data into storage) or queries for data (e.g., such as a structured query language request (SQL) for selecting data) and service many other data management or storage services. Multiple customers may access a data store cluster 115 to obtain data store services via a client 125.

The performance service 110 may be a service that monitors a data store structure and query activity within the distributed data store system 105. Using a set of predefined criteria, the performance service 110 may execute at least one process that may compare a data store structure and queries executed within the distributed data store system 105 with the set of criteria to determine whether changes made to the data store structure would result in better performance and a more efficient distributed data store system 105. In the event that a process executed by the performance service 110 determines that changes made to the data store structure may improve efficiency and/or performance of the distributed data store system 105, the performance service 110 may provide the proposed changes to a customer. The proposed changes can be presented or provided to the customer through a graphical interface, a saved document, a text interface, or another user interface. For example, in a distributed data store system 105, queries may be executed that cause certain blocks of data to be moved from one node to another node to enable the query to execute within a data store cluster. The performance service 110 may observe that the same blocks of data are frequently moved around between the nodes and therefore, may determine that query performance may be improved if the blocks of data were to be replicated on the set of nodes. Once replicated, a query referencing the node that contains the replicated data blocks may perform faster because the data blocks are contained on the node that the query is referencing. Having made the observation that replicating the data between the set of nodes may improve query performance, the performance service 110 may then provide a customer with a proposed update for replicating the data between the set of nodes.

Using a client 125, a customer may connect to the distributed data store system 105 over a network 120 and view the proposed updates provided by the optimization service 110. The proposed updates may be displayed in a distributed data store control interface 112 that may allow a customer to set and modify properties for different elements of the distributed data store system 105. The customer may accept proposed updates by initiating changes to the distributed data store structure via a control interface. For instance, the performance service 110 may provide an SQL statement or a script that a customer may execute that implements the proposed updates.

Figure 2A:
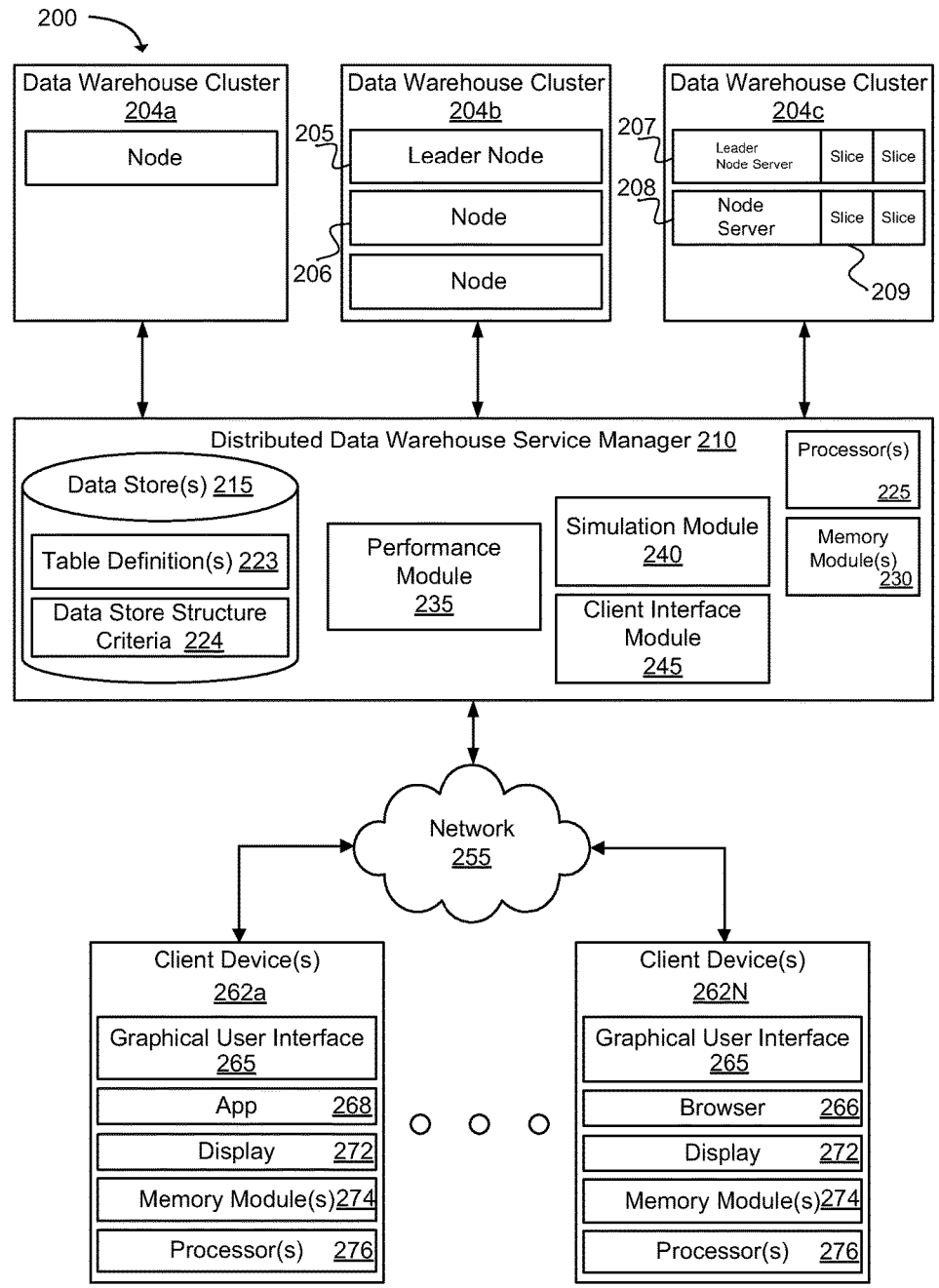
FIG. 2a is a block diagram illustrating an example system for improving data store performance.

FIG. 2a illustrates an example of various components of a distributed data warehouse system 200 on which the present technology may be executed. The distributed data warehouse system 200 may contain one or more data warehouse clusters 204a-204c, which may be in data communication with a distributed data warehouse service manager 210. A number of clients 262a-262N may communicate with the distributed data warehouse service manager 210 via a network 255. As illustrated in this example, the clients 262a-262N may access the distributed data warehouse service manager 210 to set up and manage a configuration of a data warehouse cluster 204a-204c to which the distributed data warehouse service manager 210 has access. The data warehouse clusters 204a-204c may include at least one compute node on which data may be stored on behalf of the clients 262a-262N that have access to the data warehouse clusters 204a-204c. A data warehouse cluster 204a-204c having more than one node may include a single leader node 205 that receives requests from various clients 262a-262N and parses the request to develop an execution plan to carry out an associated data store operation(s). More specifically, a leader node 205 may develop a series of steps necessary to obtain results for complex queries and joins. In some examples, the leader node 205 may manage communications between the distributed data warehouse system and clients 262a-262N, as well as communications with compute nodes 206 that may be instructed to carry out database operations. For example, compiled code may be distributed by the leader node 205 to various compute nodes 206 to carry out the steps needed to perform queries, and intermediate results of those queries may be sent back to the leader node 205.

In some example configurations, a data warehouse cluster 204a-204c may also include one or more compute node servers 208, and each may include individual query processing slices 209 defined, for example, for each core of a server's multi-core processor. The compute node servers 208 may perform the processing of queries by executing the compiled code of the execution plan and by sending intermediate results from those queries back to the leader node server 207 for aggregation. Each slice 209 may be allocated a portion of the corresponding node server's memory and disk space in order to process a portion of the workload for a query (or other database operation) that may be sent to one or more of the compute node servers 208. In some examples, an interconnect network in the cluster may provide private network communication using an existing or customer protocol, such as a custom User Datagram Protocol (UDP) to exchange compiled code and data between the leader node and the compute nodes.

Various applications and/or functionality may be executed on one or more processors 225 that are in communication with one or more memory modules 230 within the distributed data warehouse system 200. More specifically, the distributed data warehouse service manager 210 may comprise, for example, of a server or any other system providing computing capability that may perform operations using certain services and/or modules for the present technology. Alternatively, a number of distributed data warehouse service managers 210 may be employed that are arranged, for example, with one or more data warehouse clusters 204a-204c. For purposes of convenience, the distributed data warehouse service manager 210 is referred to in the singular, but it is understood that a plurality of distributed data warehouse managers 210 may be employed in the various arrangements as described above.

In one example configuration, the distributed data warehouse service manager 210 may include a data store 215, a performance module 235, simulation module 240, client interface module 245 as well as other services, processes, systems, engines, or functionality not discussed in detail herein. The performance module 235 may execute certain logic that may analyze the data store structure of a distributed data warehouse to determine whether optimizations may be made to the data store structure that may increase efficiency and performance of the distributed data warehouse system 200. As stated earlier, a data structure may refer to how a distributed data warehouse may be structured. For instance, a data store structure may be the organization of a collection of data into columns, rows, tables and clusters within the distributed data warehouse. In addition, a data store structure may refer to how data and data structures may be defined within a distributed data warehouse. For example, a data store structure may include table definitions 223, which may be attributes or properties that may be applied to a table's columns and/or rows. Examples of table definition attributes may include column size, column data type, primary key, foreign key, sort key, distribution key, compression encoding, etc.

The performance module 235, in one example configuration, may execute logic that analyzes the data store structure of a data warehouse cluster 204a-204c to determine whether the data store structure corresponds to certain data store structure criteria 224. For example, the logic may compare different aspects of the data store structure to data store structure criteria 224 that may be predetermined and based on a number of different factors. In one example, a factor that may determine data store structure criteria 224 may be the architecture of a data store (e.g., distributed data store, non-distributed data store, relational data store, non-relational data store, etc.). As an example, in a distributed data warehouse system, data store structure criteria 224 may include a criterion that the data store structure include a column selected as a distribution key so that data may be distributed evenly across a number of nodes. Other examples of data store structure criteria 224 may be a criterion that a column be selected as a sort key or a criterion that data compression be enabled for a table. Based on the data store structure criteria 224, the logic may analyze aspects of the data store structure that are associated with a criterion and determine whether the data store structure corresponds with the criterion. In a case where the logic may determine that an aspect of the data store structure does not correspond with a certain criterion, an electronic flag may be set indicating that the aspect of the data store structure does not correspond with the criteria and the electronic flag may be stored in memory (e.g., RAM, hard-drive, etc.) and may be referenced once analysis of the distributed data warehouse system 200 may be complete.

The performance module 235 may also execute logic that analyzes a number of queries executed against a data warehouse cluster 204a-204c. The queries may be analyzed to determine performance of the queries in relation to the structure of a data warehouse cluster 204a-204c. In one example, the logic may determine an efficient data store structure by examining query plans for queries executed against a data warehouse cluster 204a-204c. From the query plans, it may be determined, for example, that a majority of queries executed may be using a large portion of a data warehouse cluster's resources. For example, a majority of queries may be selecting data that may be scattered across several different data warehouse cluster nodes. Because data may be scattered across several nodes, more resources may be needed to execute a query selecting the data. To determine whether a majority of queries may be optimized by making changes to a data warehouse cluster's structure, a simulation of a data store structure that incorporates optimizations to the data store structure may be built and queries may be executed against the simulated data structure to determine whether the optimizations result in improved query performance. For example, a simulation that groups data together on a single node can be constructed and queries can then be executed against the simulation. If an improvement in query performance is detected, the simulated changes may be saved so that the simulated changes may be presented to a customer once analysis of the distributed data warehouse system 200 may be finished.

Upon completing analysis of the data warehouse cluster's data store structure and the queries executed against the data warehouse clusters 204a-204c, the performance module 235 may execute logic that implements a proposed data store structure based upon the results of analyzing the data store structure and query performance. As an example, a proposed data store structure may be developed by gathering the results of the different analysis performed by the logic of the performance module 235 by referencing the electronic flags set earlier. The proposed data store structure may then be presented to a customer with an explanation that by implementing the proposed data store structure, performance of the distributed data warehouse system 200 may be improved.

The distributed data warehouse service manager 210 may include a simulation module 240 that may be configured to execute a simulation of a proposed data store structure as applied to a data warehouse cluster 204a-204c. The results of the simulation may be provided to a customer, thereby giving the customer an estimate of performance (i.e., increase or decrease) if the proposed data store structure were implemented. As an example, based upon the analysis performed by the performance module 235, modifications to a data warehouse cluster's data store structure may be proposed and the proposals may be implemented in a data store structure simulation. The simulation may be run and example queries may be executed against the simulated data store structure. Results of the simulation may be compared to metrics of the present data store structure and then the comparison may be provided to a customer.

A client interface module 245 may provide a customer with a graphical user interface (GUI), such as a command console for interfacing with a distributed data warehouse system 200. Using a command console, a customer may view and modify resources and settings for a distributed data warehouse. For example, a command console may provide a customer with a visual representation of the distributed data warehouse's resources (e.g., clusters, nodes, allocated memory, CPU utilization, total storage, etc.), as well as the distributed data warehouse's data store structure attributes (e.g., table definitions, cluster distribution, compression encoding, etc.). The client interface module 245 may be in communication with the simulation module 240 and may provide simulation results to a customer via displaying the simulation results in a command console.

A client device 262a-N may include any device that may be capable of sending and receiving data over a network 255. A client device 262a-N may comprise, for example a processor-based system such as a computing device. Such a computing device may contain one or more processors 276, one or more memory modules 274 and a graphical user interface 265. A client device 262a-N may be a device such as, but not limited to, a desktop computer, laptop or notebook computer, tablet computer, mainframe computer system, handheld computer, workstation, network computer, or other devices with like capability. The client device 262a-N may have one or more applications 268 installed on the client device 262a-N that may provide access to the distributed data warehouse system 200. Also, a client device 262a-N may include a browser 266 that may enable the client device 262a-N to communicate with the distributed data warehouse system 200 by way of a server side executed command console. The client device 262a-N may include a display 272, such as a liquid crystal display (LCD) screen, gas plasma-based flat panel display, LCD projector, cathode ray tube (CRT), or other types of display devices, etc.

Various data may be stored in a data store 215 that is accessible to the distributed data warehouse service manager 210. The data stored in the data store 215 may include, for example, table definitions 223, data store structure criteria 224, as well as other types of data used by the distributed data warehouse service manager 210. The term "data store" may refer to any device or combination of devices capable of storing, accessing, organizing and/or retrieving data, which may include any combination and number of data servers, relational databases, object oriented databases, cloud storage systems, data storage devices, data warehouses, flat files and data storage configuration in any centralized, distributed, or clustered environment. The storage system components of the data store 215 may include storage systems such as a SAN (Storage Area Network), cloud storage network, volatile or non-volatile RAM, optical media, or hard-drive type media. The data store 215 may be representative of a plurality of data stores 215 as can be appreciated.

Figure 2B:
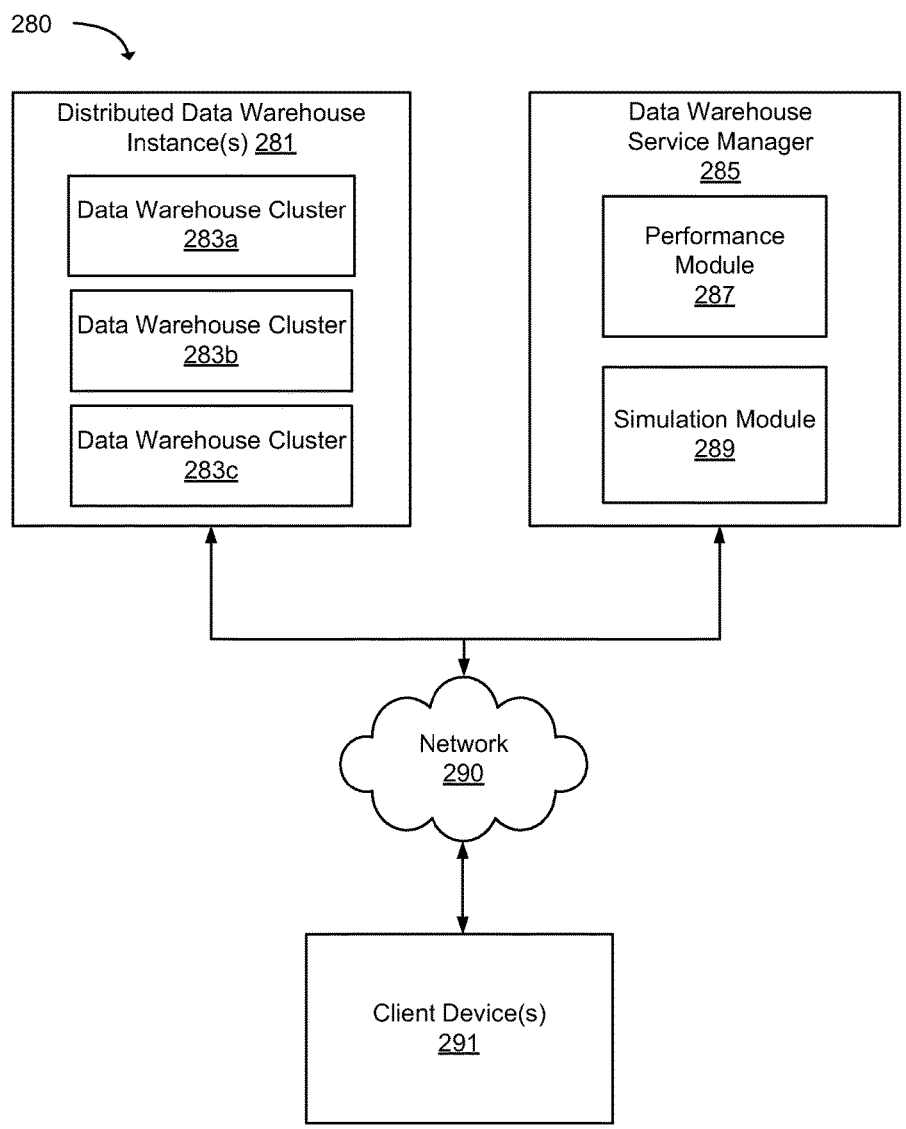
FIG. 2b is a block diagram illustrating another example system for improving data store performance

FIG. 2b illustrates another example of a distributed data warehouse system 280 that includes a data warehouse service manager 285 that may be independent of any particular distributed data warehouse instance 281. The distributed data warehouse system 280 may comprise of a distributed data warehouse instance 281 that includes one or more data warehouse clusters 283a-b, a data warehouse service manager 285 and a number of client devices 291 that may be in communication with one or more distributed data warehouse instances 281 by way of a network 290. Also, the client devices 291 may be in communication with the data warehouse service manager 285 through a network 290. The data warehouse service manager 285 may execute various applications and/or functionality, which may include a performance module 287 and a simulation module 289, upon which the present technology may be performed.

Figure 3:
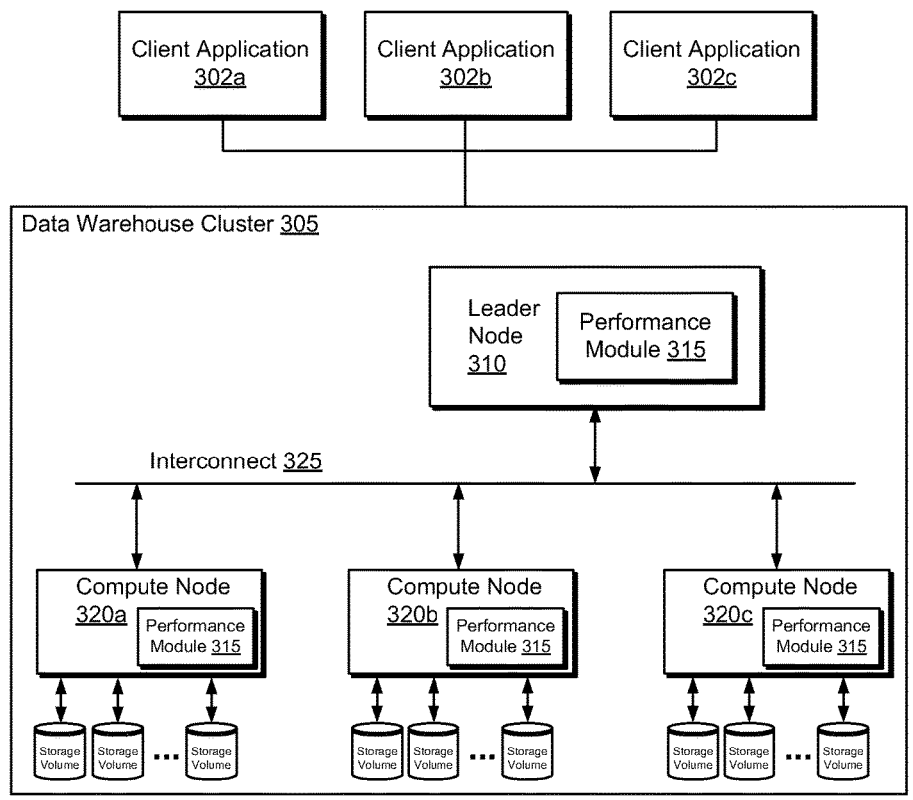
FIG. 3 is a block diagram that illustrates an example distributed data warehouse system.

FIG. 3 is a block diagram illustrating an example of a data warehouse cluster 305 in a distributed data warehouse system. The data warehouse cluster 305 may be comprised of one or more compute nodes 320a-320c that may have assigned processors and memory. In a case where a data warehouse cluster 305 may contain two or more compute nodes 320a-320c, a leader node 310 may coordinate the compute nodes 320a-320c and may handle external communication with other components of a distributed data warehouse system, including client applications 302a-302c. Communication between the leader node 310 and client applications 302a-302c may be made via a communication protocol API such as, for example, open database connectivity (ODBC) or Java database connectivity (JDBC). Communication between the leader node 310 and the compute nodes 320a-320c may be over a virtual or physical interconnect 325. The compute nodes 320a-320c in the data warehouse cluster 305 may include multiple storage volumes (e.g., virtual or physical) on which data may be stored on behalf of client applications 302a-302c.

The leader node 310 may perform actions, such as parsing and developing execution plans for SQL statements that may be received by the leader node 310 and carry out data store operations based on the execution plans. In this example, the leader node 310 and the compute nodes 320a-c may include a performance module 315 that may execute logic that analyzes the actions of the of the node (e.g., execution plans, data store operations) that the performance module 315 is associated with, as well as the data store structure of the data warehouse cluster 305. As will be appreciated, one or more nodes (i.e., leader nodes and/or computes nodes) may or may not include a performance module 315. Based on the analysis, the performance module 315 may propose changes to the data store structure that may result in increased performance for a majority of query statements (e.g., SQL statements) executed on the data warehouse cluster 305. As a specific example, after analyzing a number of queries, the performance module 315 may determine that a specific column from a table appears in a join operation in 70% of the queries executed, but the column is not used as a distribution key in the data warehouse cluster 305. The performance module 315 may determine that the 70% of queries referencing the column may improve in performance if the column were made a distribution key. Having performed the analysis and determined proposed changes to the data store structure, the performance module 315 may instruct the leader node 310 to communicate the proposed changes to the data warehouse cluster's data store structure on to a client application 302a-302c that may be associated with the applicable data warehouse cluster 305.

FIG. 2a, FIG. 2b and FIG. 3 illustrate that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, cloud, grid or cluster computing system. An application program interface (API) may be provided for each module to enable a second module to send requests to and receive output from the first module. Such APIs may also allow third parties to interface with the module and make requests and receive output from the modules. While FIG. 2a, FIG. 2b and FIG. 3 illustrate an example of a distributed data warehouse system that may implement the techniques above, many other similar or different environments are possible. The example environments discussed and illustrated above are merely representative and not limiting.

Figure 4:
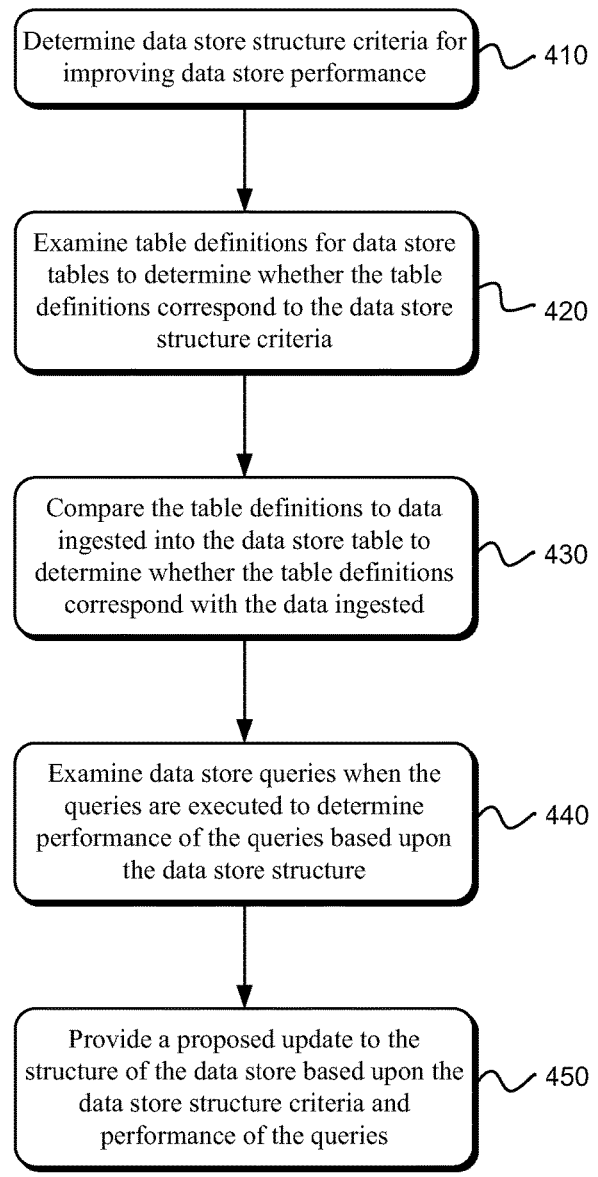
FIG. 4 is a flow diagram illustrating an example method for adaptively improving data store performance.

Moving now to FIG. 4, a flow diagram illustrates an example method for adaptively optimizing data store performance. As in block 410, data store structure criteria may be determined for improving data store performance for a data store. The data store structure criteria may relate to aspects of a data store structure that when configured may affect performance of data store operations. Examples of data store structure criteria may include a criterion that a sort key be selected, a criterion that a distribution key be selected, a criterion that data compression be enabled for a table, a criterion that data be distributed evenly among the nodes in a cluster, as well as other criteria that may result in improved performance of the data store.

After determining data store structure criteria, table definitions for the tables contained in the data store may be examined, as in block 420, to determine whether a table definition corresponds with the data store structure criteria. A table definition may include properties that may be associated with a table. One example of a table definition property may be a column data type that defines what type of data may be placed in a column. For example, a column may have a data type definition of integer, single, double, short, long, character, currency, date/time, etc. Defining data types for columns may aid in efficiently allocating storage space for data in a column and may improve data store operations by accurately describing data contained in a column. Another table definition property may be one or more data store keys (e.g., primary key, foreign key, sort key, distribution key) that aid in organizing tables and retrieving data from a table. A table definition for a table may be examined to determine whether properties of the table definition correspond with data structure criteria. In one example, a criterion of the data structure criteria may be that a table definition contains a sort key. A sort key may determine how data in a column may be sorted. Sort key information may be used by a query planner module to construct query plans that exploit how data in a column may be sorted. Based on the criterion, the properties of the table definition may be examined to see whether a sort key has been created.

As in block 430, table definitions may be compared to data ingested into a table to determine whether the table definition corresponds with the data being ingested into the table. In other words, a table definition may be compared to data that is ingested and stored in a table to ensure that the table definition is the most appropriate table definition for the data being stored in the table. As a specific example, one table definition property may be a column data type, which defines a column for storing a particular data type (e.g., long numbers, short numbers, characters, timestamp, etc.). In a case where a column may be used to store date/time data, but the column data type may be defined as a long number data type, the column data type may not be the most appropriate data type based on the data being stored in the column. The timestamp data type may be a better choice because of the available data store operations that may be performed on a column defined as a timestamp data type. In another example, in a case where short integer data may be stored in a column with a long integer data type, then some memory or storage allocated to the column may not be utilized because more memory may be allocated to a column with a long integer data type as compared to a column with a short integer data type. Therefore, if the column had a data type definition that corresponded with the actual data being stored in the column, less memory would be allocated to the column and could be utilized elsewhere in the data store.

As in block 440, queries executed against a data store may be examined to determine performance of the queries with respect to the data store structure. When a query may be executed, the query's execution plan may be examined to see whether data store resources are being used optimally. For example, an execution plan may be examined to determine a frequency of how often columns may be used in join operations, and then to determine whether the columns frequently used in join operations have been designated as distribution keys. Examining query execution over time may reveal efficiencies that may be realized if the data store structure is modified to better align with the majority of queries executed against the data store. For example, changes to a data store's structure (e.g., tables, fields, relationships, views, indexes, etc.) based on observation of query performance may result in improved performance by modifying the data store structure. For example, grouping data on fewer nodes, creating data store keys or switching a key from one column to another, choosing a data compression strategy, as well as other data store structure modifications.

In one example, changes to a data store structure may be simulated to see how the change to the data store may affect queries executed against the data store. As a specific example, examining a query that performs a look up for customer information may reveal that records for the customer may be distributed over several different nodes within a distributed data store. A simulation may be built that groups the customer's records onto a single node and then the query may be run within the simulation to determine whether grouping the customer's records onto a single node improves the query's performance.

As in block 450, changes that may improve data store performance may be provided to a customer as proposed updates to the data store structure which have been identified based upon the data store structure criteria and query performance. For example, a customer may be presented with proposed updates to a data store structure along with an explanation as to why the proposed updates are being presented. The customer may then either accept the proposed updates by implementing the proposed updates or the customer may choose to not implement the proposed updates.

Figure 5A:
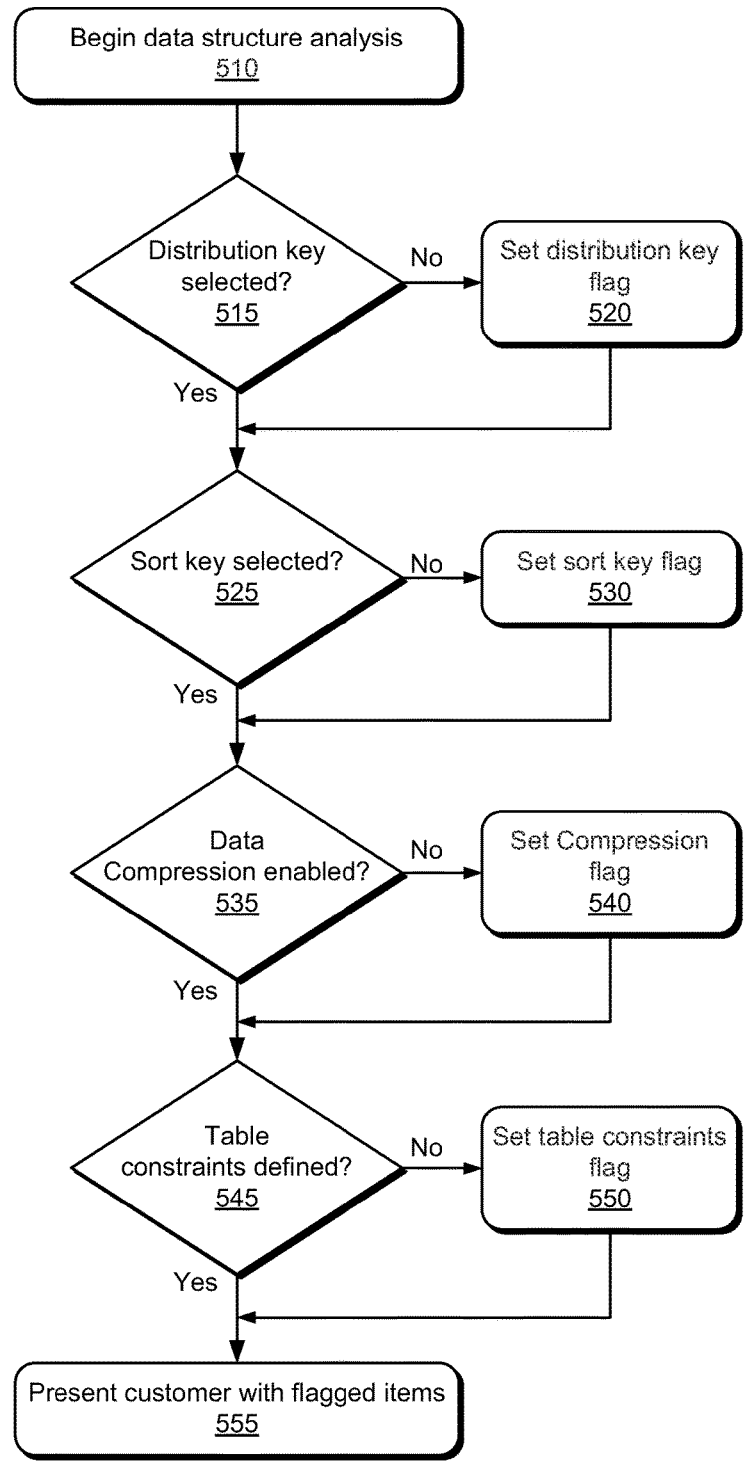
FIG. 5a is a flow diagram that illustrates an example method analyzing a data store structure.

FIG. 5a is a flow diagram illustrating one example method for analyzing a distributed data store structure. Beginning in block 510, the method may analyze a distributed data store structure by examining various aspects of the distributed data store structure. Aspects of the distributed data store structure to be examined may be determined, in one example, by an efficient practices approach to designing a distributed data store structure. For instance, there may be aspects of a distributed data store structure that influence overall query performance more so than other aspects by reducing a number of input and output (I/O) operations and minimizing memory used to process queries. In this example, an efficient practices approach may be to select a distribution key, select a sort key, choose a data compression strategy and to define table constraints (e.g., define a primary key and foreign key constraints between tables wherever appropriate). In one example, the method may analyze a distributed data store structure using this automated technology after a distributed data store structure has been designed, in order to verify that an efficient practices approach has been followed.

As in block 515, the method may analyze tables within a distributed data store structure to determine whether a column in a table has been selected as a distribution key. A distribution key may determine how data in a table may be distributed across two or more nodes in a distributed data store. Effective data distribution within a distributed data store may distribute data evenly among the different nodes in the distributed data store and may collocate data for join operations so that data movement between nodes may be minimized. In a case where a column has not been selected as a distribution key, an electronic flag may be set, as in block 520, which indicates that a distribution key has not been selected. In one example configuration, the distributed data store structure may be examined to determine which column in a table may be a good candidate for a distribution key. For example, the method may determine that a certain column is frequently used to join a table and that column may be specified as a good candidate for the distribution key.

As in block 525, the tables of the distributed data store may be analyzed to determine whether a column within a table may have been selected as a sort key. A sort key may be used to sort data within a table in an order according to the sort key. A query planner module may reference the sort order of a table when the query planner module devises an efficient query plan. For example, sort key information may be passed to a query planner module and the query planner module may use the information to construct a plan that exploits the way the data is sorted. In a case where a table does not have a column selected as a sort key, an electronic flag may be set, as in block 530, which indicates that a sort key has not been selected for the table. In one example configuration, a column may be recommended to a customer to use as a sort key. As a specific example, a column containing timestamp data may be recommended as a sort key when a majority of queries selecting data from a table select the most recent data added to the table. In other words, because queries may be looking for the most recent data added to a table, sorting the table by a column containing timestamp data will group the data most recently added at the top of the table.

As in block 535, analysis of the tables of the distributed data store may be done to determine whether a data compression strategy has been implemented. Data compression may be a column level operation that may reduce the size of data stored in the column. Data compression may conserve storage space and reduce the size of data. Data compression may reduce the amount of I/O (input/output) operations and therefore may improve query performance. A compression type or encoding may be defined for one or more columns within a table. Various compression encodings may be selected and some compression encodings may be better suited for some data types. Some examples of compression encodings may include raw encoding, byte-dictionary encoding, delta encoding, run-length encoding, text255 and text32k encodings. In a case where data compression may not be enabled for any columns of a table, an electronic flag may be set, as in block 540, which indicates that data compression has not been enabled for any columns of the table. In an example configuration, a data compression encoding for a column may be recommended to a customer by, for example, determining the data type of data stored in the column and recommending a compression encoding that may be a good fit for the data type.

As in block 545, tables of the distributed data store may be analyzed to determine whether table constraints for the table have been set. Table constraints may be methods that may be applied to a table that enforce uniqueness of data throughout a table. For example, a primary key and a foreign key may be used to enforce uniqueness of data within a table and between tables. In a case where table constraints have not been set in a table, an electronic flag may be set, as in block 550, which indicates that table constraints have not been implemented for a table. In an example configuration, recommendations for table constraints may be determined by analyzing a table to determine one or more columns that may be used to enforce uniqueness of data within the table, as well as analyzing multiple tables in a distributed data store to determine columns within the tables that may be used to enforce uniqueness among the multiple tables.

As in block 555, after analyzing the different aspects of a distributed data store structure to determine whether efficient practices may have been implemented that result in query improvement, those aspects that may have been flagged as not having efficient practices implemented may be presented to a customer as proposed updates to the distributed data store structure. In addition, an explanation may accompany an associated proposed update explaining why the proposed update may increase overall query performance. An example configuration may also include specific recommendations, such as for example, recommending a specific column to be used as a sort key, suggesting a specific data compression encoding, as well as other specific recommendations.

Figure 5B:
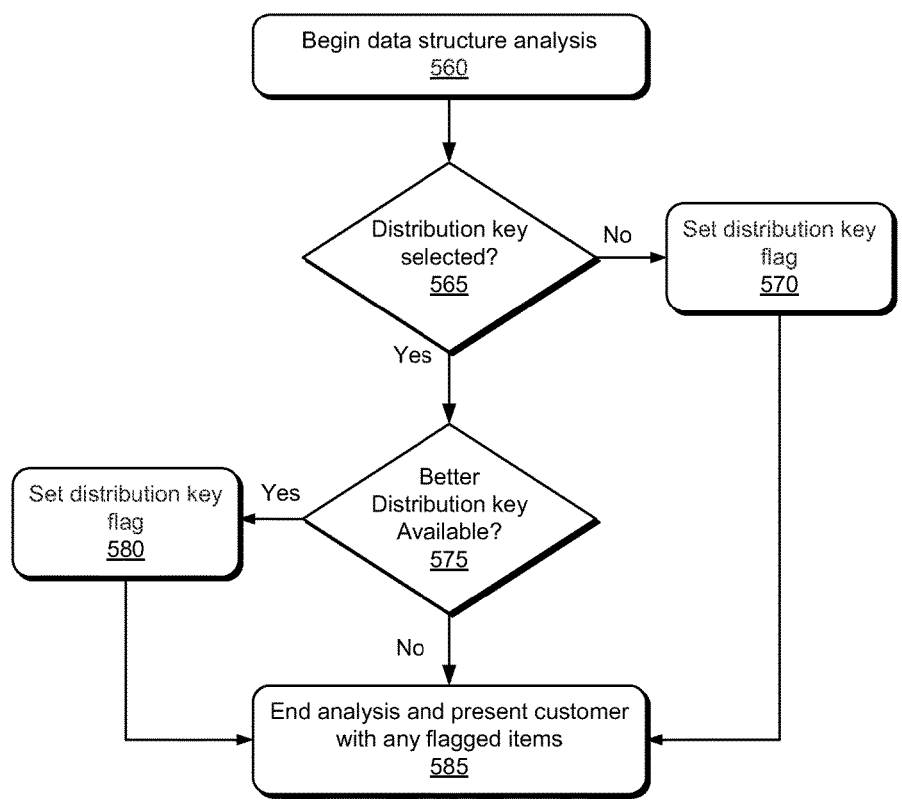
FIG. 5b is a flow diagram illustrating an example method for analyzing one aspect of a data store structure.

FIG. 5b is a flow diagram illustrating an example of a method similar to the example method illustrated in 5a. The method in this example analyzes one aspect of a distributed data store structure. Beginning in block 560, the method may analyze a distributed data store structure by, as in block 565, examining whether a distribution key has been selected for the distributed data store structure. In a case where there may not be a distribution key selected for the distributed data store structure, then an electronic flag may be set, as in block 570, which may indicate that a distribution key has not been selected. In a case where a distribution key may have been selected, then as in block 575, the method may analyze the distributed data store structure to determine whether a column other than the column currently acting as the distribution key may be a better choice for a distribution key. If another column may be a better choice for the distribution key, then as in block 580, an electronic flag may be set. As in block 585, after analyzing the distribution key aspect of the distributed data store structure, a customer may be presented with any results of the analysis. In the case that a better distribution key may be available, the customer may be presented with specific distribution key recommendations.

Figure 6:
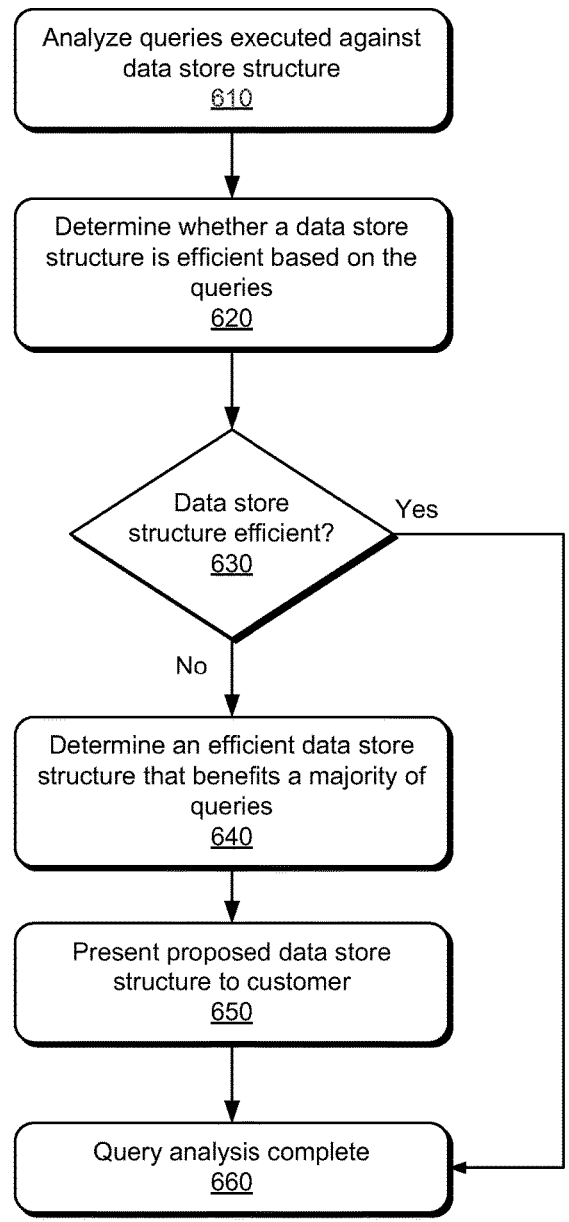
FIG. 6 is a flow diagram illustrating an example method for analyzing queries with respect to a data store structure.

FIG. 6 is a flow diagram illustrating an example method for observing queries executed against a data store and determining proposed updates to an associated data store structure based upon query performance. As in block 610, a number of queries may be analyzed as the queries are executed against a data store and analysis may be performed to determine how data store structure resources are being utilized by the query. In one example configuration, metrics may be recorded for queries executed against a data store. The metrics may represent utilization of data store structure resource by the queries. Examples of data store structure resources may include tables the queries may be referencing, columns used to join tables, memory being utilized by the queries, as well as additional data store structure resources.

As in block 620, after analyzing the execution of the queries, the method may then determine whether the data store structure may be improved to the queries being executed. The method may make a determination of data store structure improvement, in one example, by creating a data store structure simulation that includes simulated changes to a data store structure. In one example configuration, the method may determine which data store structure changes to simulate by analyzing query metrics of the different queries. Based on a predetermined threshold (e.g., a query utilizing more than 70% of available memory), changes to a data store structure may be selected that may be expected to positively affect query execution. As a specific example, if query metrics associated with a join operation exceed a time threshold to perform the join, then modifications to the tables that may be involved in the join operation may be selected. Simulated queries may then be executed against the simulated data store structure and metrics generated by the simulated queries may then be compared to metrics of the queries analyzed in block 610.

In the case 630 where results of the query metrics comparison may indicate that the data structure may be optimal and no data structure modifications may be warranted, then, as in block 660, no further action may be desired and query analysis may be complete. In the case 630 where the metrics comparison may indicate that modifications to the data store structure may result in an optimized data store structure, then, as in block 640, a data store structure that benefits a majority of queries may be determined. Although modifications to the data store structure may improve performance of some queries, the modifications may not improve performance for every query executed against the data store. Therefore, in one example configuration, the method may determine and select those modifications that may improve performance for a majority of queries executed against the data store. In another example configuration, the method may determine and select modifications that improve performance for those queries that may be most often executed. And yet in another example configuration, a customer may be presented with information enabling the customer to make a decision about which queries should benefit from data store structure optimization.

As in block 650, a proposed data store structure may be presented to a customer. The proposed data store structure may be based upon the modifications to the data store structure determined earlier. The customer may be presented with additional information that explains how the proposed data store structure may benefit query performance, as well as explaining which queries may be benefited. Upon presenting the proposed data store structure to a customer, then, as in block 660, query analysis may be complete.

Figure 7:
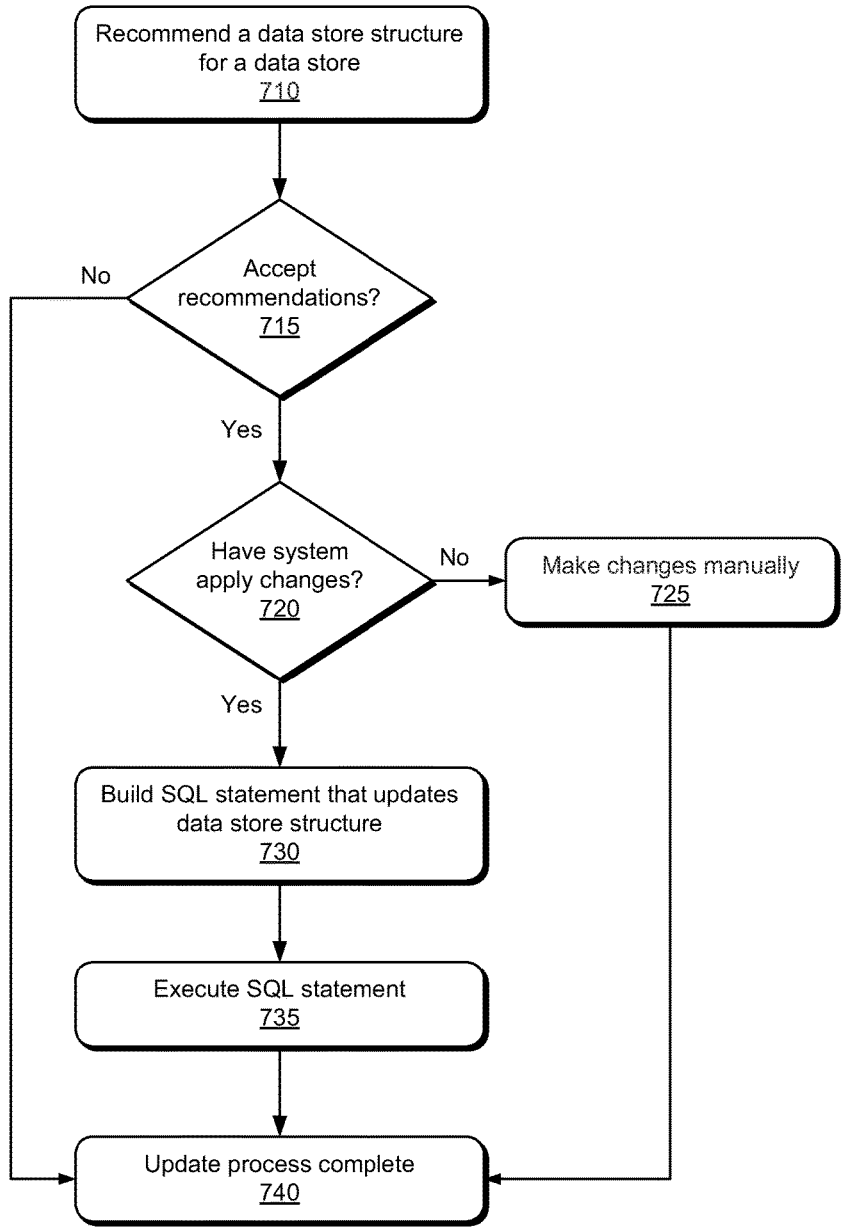
FIG. 7 is a flow diagram illustrating an example method for updating a data store structure.

FIG. 7 is a flow diagram illustrating an example method for recommending a data store structure to a customer. As in block 710, after analyzing a data store structure to determine an optimized data store structure, the data store structure may be recommended to a customer. In a case 715 where a customer chooses not to accept the recommendations, then, as in block 740 the update process may then be complete. In the case 715 that a customer does accept the recommendations, then the customer may then be given the option to have the changes to the data store structure implemented by the data store system 720 rather than the customer manually making changes to the data store structure. Alternatively, the data store structure may be replicated (i.e., a new copy of the data structure may be created) and the changes to the data store structure may be applied to the replicated data store structure. Thus, the replicated data store structure may be used instead of the previous data store structure. If the customer chooses not to have the changes to the data store structure implemented by the data store system, then, as in block 725, the customer may make the changes to the data store structure by, in one example, accessing the different aspects of the data store structure and modifying the different aspect's configurations based upon the data store structure recommendations. Where the customer applies their own changes, applying the changes may include writing the customer's own code and scripts to effect the changes. If the customer chooses to have the data store system apply the recommended changes, then, as in block 730, the data store system may build an SQL statement, script or command that, when executed, updates the data store structure with the recommended changes. In a case where the data store may be a non-relational data store, data store commands associated with the non-relational data store may be constructed and executed to update the data store structure with the recommended changes.

As in block 735, after building an SQL statement that incorporates the recommended changes to the data store structure, the SQL statement may be executed. As an example, the SQL statement may modify the table layout of the data store, partition tables, modify column configurations, create keys (e.g., primary key, sort key, distribution key), redistribute data among different nodes, etc. Having built and executed the SQL statement, the recommended changes to the data store structure may have been implemented and, as in block 740, the update process may then be complete.

Figure 8:
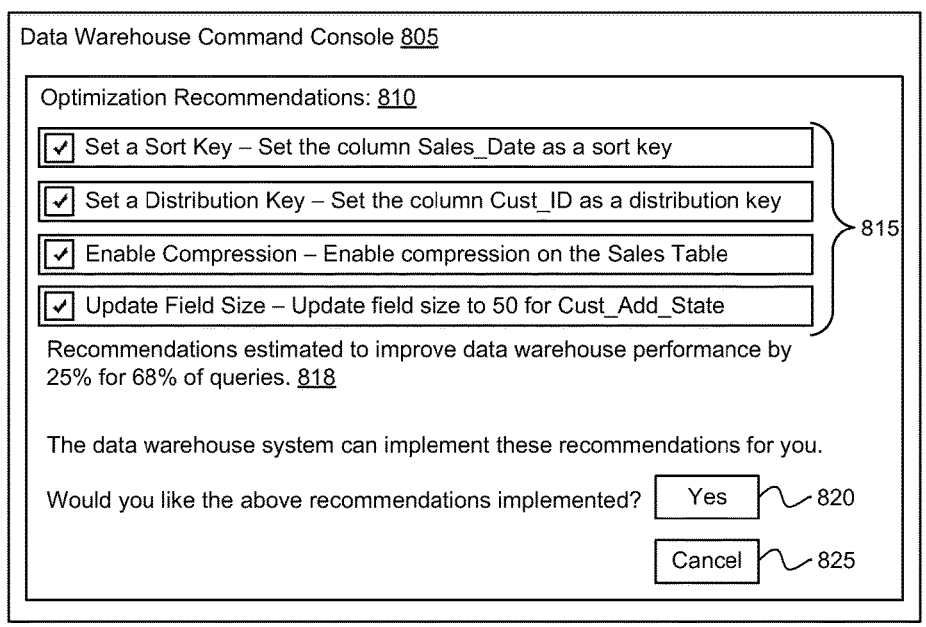
FIG. 8 is a diagram illustrating an example data warehouse interface that displays improvement recommendations.

FIG. 8 is an illustration of an example data warehouse command console 805 that may be used to display one or more data warehouse optimization recommendations 810 to a customer. The data warehouse command console 805 may provide to a customer the optimization recommendations 810 by displaying a list of optimization recommendations 815 along with associated instructions that explain how to implement an optimization recommendation. As a specific example, a list of optimization recommendations 815 may include setting a sort key, setting a distribution key, enabling data compression and updating a field size. In addition, the command console 805 may provide a customer with an estimate of improved performance 818 if the optimization recommendations are implemented. Included in the list of optimization recommendations 815 may be instructions explaining how to implement an optimization recommendation. For example, where a recommendation may be provided that recommends a customer decrease a field size in order to increase storage efficiency within a table, a customer may be provided with an instruction that specifies a suggested field size.

In this example, an option may be provided to a customer that allows the data warehouse system to implement one or more of the optimization recommendations 810 by constructing an SQL statement and executing the SQL statement. The option may be displayed to the customer within the data warehouse command console 805 and the customer may execute the SQL statement by selecting an interface control, such as a yes button control 820. In the case where the customer may not want the data warehouse system to implement the recommendations via an SQL statement, the customer may select the cancel button control 825 and then implement one or more optimization recommendations 810 by configuring the data store structure using the data warehouse command console 805 or some other type of data warehouse interface.

Figure 9:
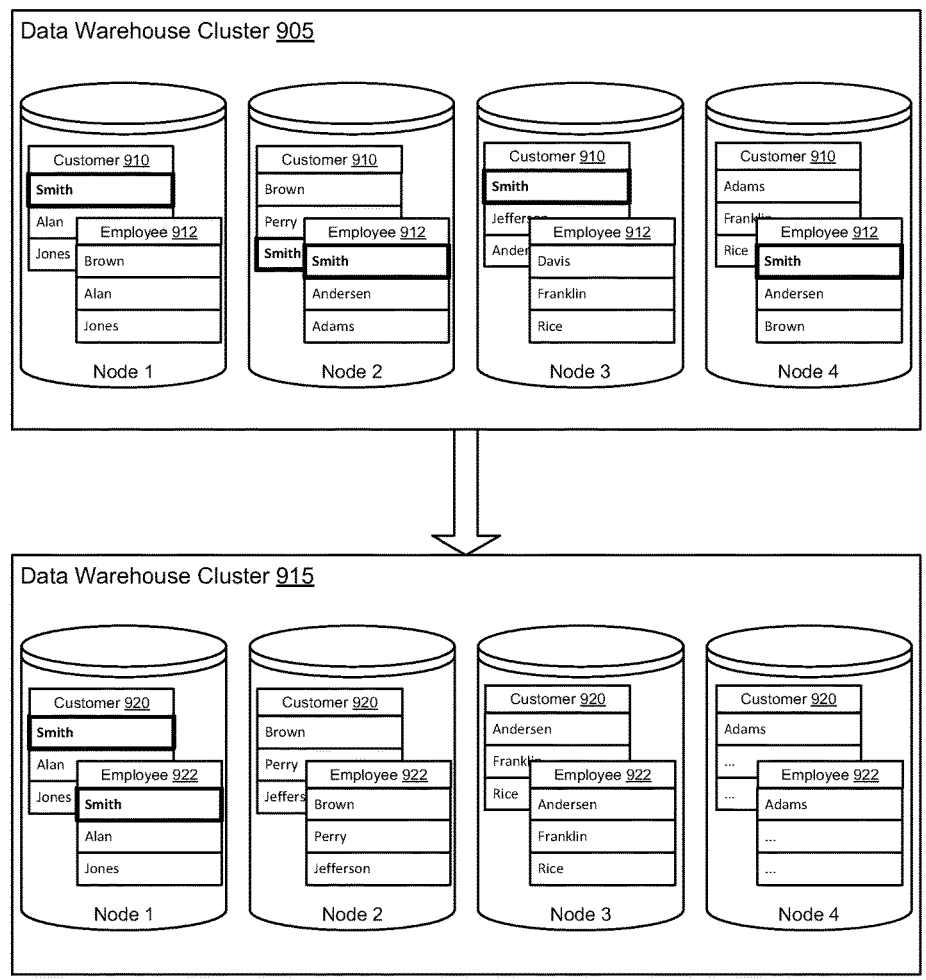
FIG. 9 is a diagram illustrating an example of a column in a distributed data warehouse cluster that is selected as a distribution key.

FIG. 9 is an example diagram illustrating one aspect of a data warehouse cluster 905 and the optimizing effect of creating a distribution key for a table contained within the data warehouse cluster 905. The data warehouse cluster 905 shown in this example may contain four nodes (i.e., Node 1, Node 2, Node 3 and Node 4) having a number of tables that may be distributed between the four nodes. The tables distributed between the four nodes may include a first table having a customer column 910 and a second table having an employee column 912. The customer column 910 may contain customer names that may be associated with other data within a node. For example, a customer name may be associated with an employee name contained in the employee column 912. Prior to creating a distribution key, a customer name contained in the customer column 910 may be spread throughout a number of nodes within the distributed first table (e.g., Node 1, Node 2, Node 3 and Node 4). For example, the customer name "Smith" may be found in the customer column 910 on Node 1, Node 2, Node 3 and Node 4. Because the customer name "Smith" may be scattered throughout the different nodes, a query joining the first table and the second table looking for the customer "Smith" may have to access several nodes instead of a single node.

The present technology may propose a data store structure that includes creating a distribution key for a table. Once a distribution key may have been created, a leader node may distribute data to nodes based upon the values in the distribution key column, where matching values from the distribution key column may be stored together on a single node. For example, the customer column 920 may be selected as the distribution key column for a first table contained in a data warehouse cluster 915, and the employee column 922 may be selected as the distribution key column for a second table. After creating the distribution key column, the customer names and the employee names may then be consolidated onto a single node. For example, the customer name "Smith" may be consolidated onto Node 1. Having data grouped together on the same node (e.g., Node 1) may improve query performance because having the data grouped together on a single node eliminates a need to move the data across a network between two or more nodes when a join query may be executed.

Figure 10:
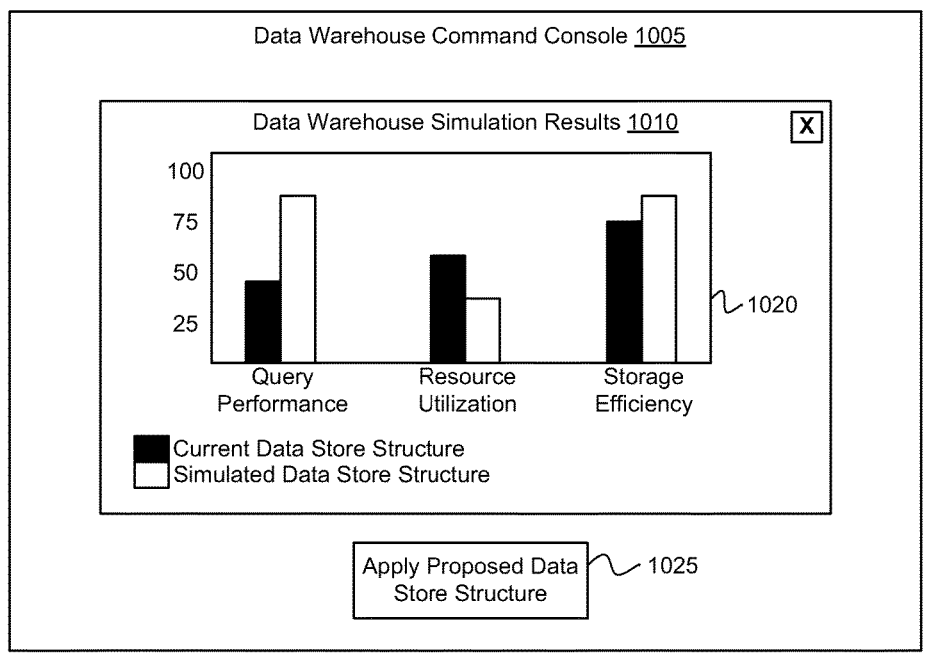
FIG. 10 is a diagram illustrating an example data warehouse interface displaying simulation results.

FIG. 10 is an example diagram illustrating a data warehouse command console 1005 displaying results of a data warehouse simulation 1010. In this example, after analyzing a data warehouse data store structure, one or more simulations may be run that simulate a proposed data store structure. The data warehouse simulation results 1010 may be compared to data warehouse metrics for the current data store structure and displayed to a customer within the data warehouse command console 1005 as a graph 1020. The graph 1020 may provide a visual comparison of different performance aspects of the current data store structure and the projected performance of the proposed data store structure. By providing a graphical comparison to a customer, the customer may be provided with a visual representation of the improvements that may be realized by implementing the proposed data store structure. In addition to viewing the graph 1020, a customer may implement the proposed data store structure via an SQL statement, scripts and/or other code constructed by the data warehouse system by selecting a control button 1025.

Figure 11:
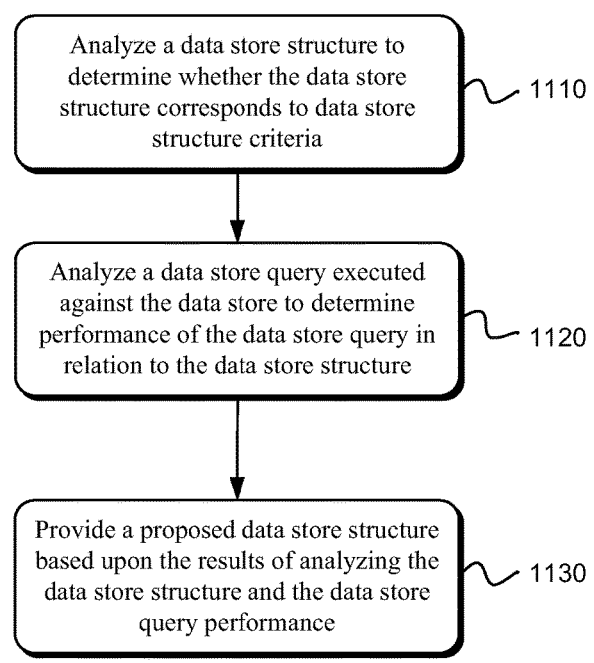
FIG. 11 is a flow diagram illustrating an example method for monitoring data store performance and recommending a data store structure for a data store.

FIG. 11 is a flow diagram illustrating an example method for monitoring data store performance and recommending a data store structure for a data store. As in block 1110, a data store structure may be analyzed to determine whether the data store structure corresponds to data store structure criteria. The data store structure criteria may include data store structure configurations that result in improved performance of queries executed against a data store and improved efficiency in storing data within a data store. Some specific examples of data store structure criteria may include: a criterion that a distribution key be selected for a table where a column from the table is selected as the distribution key, a criterion that a sort key be selected for a table where a column from the table is selected as the sort key, a criterion that data compression be enabled for one or more columns of a table, a criterion that data store constraints (e.g., primary key, foreign key) be defined and a criterion that the data is substantially distributed evenly across a number of computing nodes in a distributed data store.

As in block 1120, a data store query executed against the data store may be analyzed to determine performance of the data store query in relation to the data store structure. The data store structure (e.g., sort key, distribution key, data compression settings, data constraint definitions, etc.) may affect query performance. When a data store structure may be optimized in relation to the queries that may be executed, query performance may be improved by reducing a number of I/O operations and minimizing the memory used to process the queries. As queries may be executed, data store resources utilized by the queries may be recorded and recommendations may be made based upon the findings.

In one example configuration, the method may also include monitoring data ingested into the data store to determine whether the data corresponds to a table definition and space allocated for the data in the data store. As a specific example, where a table definition may define a column as a character type, but data ingested into the column may be timestamp type data, a recommendation may be made that the table definition for the column be changed from a character type to a timestamp type. In another specific example, if a table definition for a column allocates space for a long integer but short integer data may be stored in the column, then a recommendation may be made to change the table definition for the column from long integer to short integer.

In another example configuration, the method may also include monitoring a table definition for a data store table to determine whether changes made to the table definition correspond to the data store structure criteria. As a specific example, a table definition may include one or more columns that have been set as a primary key according to a data store structure criterion. In a case where a customer deletes the primary key resulting in a table definition where a primary key is not defined, monitoring the table definition may cause an electronic flag to be set so that the customer may be made aware that the table definition lacks a primary key.

In yet another example configuration, the method may include monitoring data store activity to determine a schedule for performing data store operations. Monitoring data store activity may include looking at a cluster load for a distributed data store, query patterns, data loads, data store backups, as well as other activity. Based on the data store activity, a schedule for performing data store operations may be developed that results in optimal use of the data store resources. For example, a recommendation may be made to a customer to schedule data store backup operations at a particular time or during a certain time window. Another example recommending may be that a customer schedules certain queries to be executed during select times.

One example configuration of the method may involve periodically analyzing different aspects of a data store structure rather than continuously monitoring the data store structure. For instance, the technology may periodically analyze a data store structure to determine whether the data store structure is efficient based upon the data store structure criteria. Also, the technology may periodically analyze a data store query to determine whether the data store structure is optimal in relation to the execution of the data store query.

Returning now to FIG. 11, after analyzing the data store structure and queries, as in block 1130, a proposed data store structure may be provided to a customer. The proposed data store structure may be based upon the results of analyzing the data store structure and the data store query performance. Specific examples of proposed data structures may include, a proposal that one or more sort keys be created for tables of the data store, that a distribution key be created for a table, that a compression encoding be selected and enabled for one or more table columns, that certain constraints be defined for the data store, as well as other proposals that may benefit data store performance.

Figure 12:
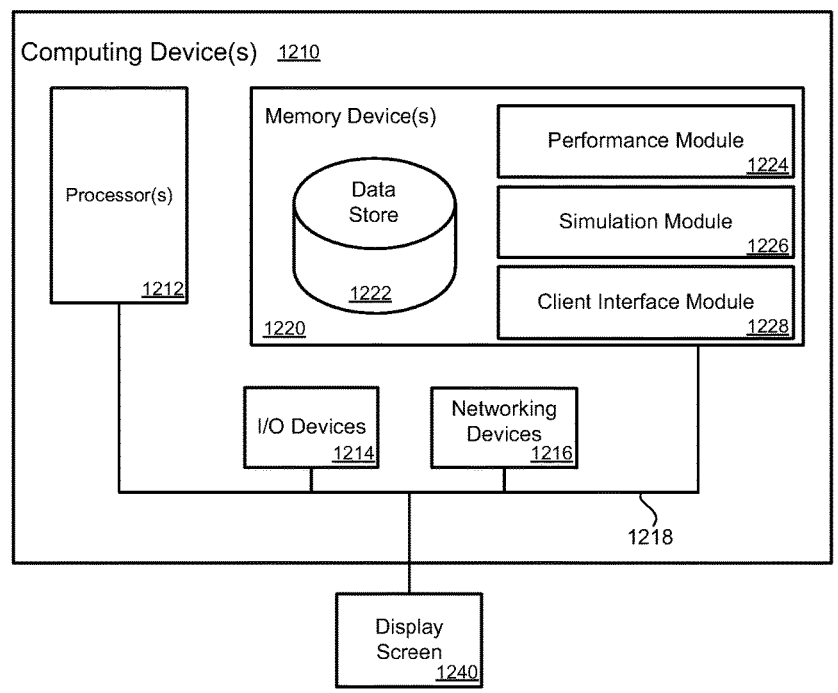
FIG. 12 is block diagram illustrating an example of a computing device for monitoring data store performance and recommending a data store structure.

FIG. 12 illustrates a computing device 1210 on which modules of this technology may execute. A computing device 1210 is illustrated on which a high level example of the technology may be executed. The computing device 1210 may include one or more processors 1212 that are in communication with memory devices 1220. The computing device 1210 may include a local communication interface 1218 for the components in the computing device. For example, the local communication interface may be a local data bus and/or any related address or control busses as may be desired.

The memory device 1220 may contain modules that are executable by the processor(s) 1212 and data for the modules. Located in the memory device 1220 are services and modules executable by the processor. For example, a performance module 1224, simulation module 1226, client interface module 1228 and other modules may be located in the memory device 1220. The modules may execute the functions described earlier. A data store 1222 may also be located in the memory device 1220 for storing data related to the modules and other applications along with an operating system that is executable by the processor(s) 1212.

Other applications may also be stored in the memory device 1220 and may be executable by the processor(s) 1212. Components or modules discussed in this description that may be implemented in the form of software using high programming level languages that are compiled, interpreted or executed using a hybrid of the methods.

The computing device may also have access to I/O (input/output) devices 1214 that are usable by the computing devices. An example of an I/O device is a display screen 1240 that is available to display output from the computing devices. Other known I/O device may be used with the computing device as desired. Networking devices 1216 and similar communication devices may be included in the computing device. The networking devices 1216 may be wired or wireless networking devices that connect to the internet, a LAN, WAN, or other computing network.

The components or modules that are shown as being stored in the memory device 1220 may be executed by the processor(s) 1212. The term "executable" may mean a program file that is in a form that may be executed by a processor 1212. For example, a program in a higher level language may be compiled into machine code in a format that may be loaded into a random access portion of the memory device 1220 and executed by the processor 1212, or source code may be loaded by another executable program and interpreted to generate instructions in a random access portion of the memory to be executed by a processor. The executable program may be stored in any portion or component of the memory device 1220. For example, the memory device 1220 may be random access memory (RAM), read only memory (ROM), flash memory, a solid state drive, memory card, a hard drive, optical disk, floppy disk, magnetic tape, or any other memory components.

The processor 1212 may represent multiple processors and the memory 1220 may represent multiple memory units that operate in parallel to the processing circuits. This may provide parallel processing channels for the processes and data in the system. The local interface 1218 may be used as a network to facilitate communication between any of the multiple processors and multiple memories. The local interface 1218 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A computer implemented method, comprising:
   performing a plurality of data store queries on data stored in a data store having a first data store structure;
   determining whether the first data store structure comprises at least one of: a table, row, column, data store cluster, or data store cluster node;
   determining that at least one of a distribution key, a sort key, a primary key, or a foreign key is not set for the first data store structure;
   analyzing the first data store structure to identify a candidate column or row for setting as the at least one of the distribution key, the sort key, the primary key, or the foreign key;
   determining query data selected in a majority of the plurality of data store queries on the data stored in the data store; and
   implementing a second data store structure for the data store based at least in part on the query data selected in the majority of the plurality of data store queries and based at least in part on at least one constraint of the first data store structure, wherein the second data store structure includes a modification of at least one data store constraint of the first data store structure selected from the group consisting of: the distribution key, the sort key, the primary key and the foreign key, and wherein implementing the second data store structure improves efficiency of data management.

2. The method as in claim 1, further comprising modifying the distribution key for a data store table of the second data store structure, wherein a column from the data store table is selected as the distribution key.

3. The method as in claim 1, further comprising modifying the sort key for a data store table of the second data store structure, wherein a column from the data store table is selected as the sort key.

4. The method as in claim 1, further comprising modifying compression encoding for at least one column in the second data store structure.

5. The method as in claim 1, further comprising determining whether data is substantially distributed evenly across a distributed data store.

6. The method as in claim 1, further comprising creating the second data store structure using a structured query language (SQL) statement that is generated and executed upon acceptance of a customer.

7. The method as in claim 1, further comprising monitoring data ingested into the data store to determine whether the data adheres to a table definition and space allocated for the data in the data store.

8. The method as in claim 1, further comprising monitoring a table definition for a data store table to determine whether changes made to the table definition correspond to a data store structure criteria.

9. The method as in claim 1, further comprising periodically analyzing a data store structure to determine whether the data store structure is based at least in part on data store structure criteria.

10. The method as in claim 1, further comprising periodically analyzing a data store query to determine whether a data store structure is efficient in relation to execution of the data store query.

11. The method as in claim 1, wherein the data store is a data warehouse or a distributed data store.

12. The method as in claim 1, further comprising:
determining that data compression is not enabled for any columns of the first data store structure;
determining that the data compression is not enabled for any columns of the first data store structure;
analyzing the first data store structure to identify a first data type of data stored in a first one of the columns to identify a first recommended data compression encoding suitable for the first data type; and
analyzing the first data store structure to identify a second data type of data stored in a second one of the columns to identify a second recommended data compression encoding suitable for the second data type;
wherein implementing the second data store structure further comprises implementing the first recommended data compression encoding for the first one of the columns and implementing the second recommended data compression encoding for the second one of the columns.

13. The method as in claim 1, further comprising:
identifying a threshold for columns used in join operations to be frequently used columns;
determining a frequency of how often columns in the first data store structure are used in join operations;
determining whether the frequently used columns have been designated as distribution keys;
designating the frequently used columns as distribution keys as part of implementing the second data store structure when the frequently used columns have not been designated as distribution keys; and
removing designation of columns as distribution keys as part of implementing the second data store structure when the columns are designated in the first data store structure as distribution keys and are not determined to be the frequently used columns.

14. The method as in claim 1, further comprising:
examining a table definition defining what type of data is placed in a column of the first data store structure;
comparing the table definition to data that is ingested into the column to determine whether the data ingested into the column matches the type of data defined in the table definition;
modifying the type of data defined in the table definition to match the data ingested into the column as part of implementing the second data store structure when the data ingested into the column does not match the type of data defined in the table definition; and re-allocating memory for the column based on modifying the table definition.

15. The method as in claim 1, further comprising:
determining that blocks of data of the first data store structure are frequently moved around between nodes;
determining that query performance will improve by replicating the blocks of data on the nodes;
recommending replicating the blocks of data on the nodes; and
implementing the replicating as part of implementing the second data store structure.

16. The method as in claim 1, further comprising providing a list to a customer specifically identifying queries that will be benefited by implementation of the proposed data store structure, wherein benefits include reducing a number of I/O operations and minimizing memory used to process the queries.

17. The method as in claim 1, wherein the second data store structure includes a modification of at least one data store constraint of the first data store structure selected from the group consisting of: the sort key, the primary key and the foreign key.

18. A system for adaptively improving data store performance, comprising:
one or more computing nodes, each of which comprises at least one processor and a memory, wherein the one or more computing nodes are configured to collectively implement:
a distributed data store;
a service manager configured to manage a plurality of nodes for the distributed data store;
a performance module configured to execute logic, comprising:
logic that determines whether a data store structure for the distributed data store corresponds to data store structure criteria, wherein the data store structure includes at least one of: a table, row, column, cluster, or cluster node;
logic that determines that at least one of a distribution key, a sort key, a primary key, or a foreign key is not set for the data store structure;
logic that analyzes the data store structure to identify a candidate column or row for setting as the at least one of the distribution key, the sort key, the primary key, or the foreign key;
logic that determines query data selected in a majority of a plurality of data store queries corresponding to the distributed data store in relation to the data store structure; and
logic that implements a proposed data store structure for the distributed data store based at least in part on the query data selected in the majority of the plurality of data store queries and based at least in part on at least one constraint of the data store structure, wherein the proposed data store structure includes a modification of at least one data store constraint of the data store structure selected from the group consisting of: the distribution key, the sort key, the primary key and the foreign key, and wherein implementing the proposed data store structure improves efficiency of data management.

19. The system as in claim 18, further comprising:
a client interface module configured to provide a customer with a customer interface to the distributed data store; and
a simulation module configured to execute a computer simulation of the proposed data store structure as applied to the distributed data store and results of the computer simulation are provided to a customer, wherein the computer simulation comprises a graph to display to a customer through the customer interface as a visual representation of improvements available through the proposed data store structure prior to implementation of the structure; and wherein the performance module further comprises executing logic that builds a SQL statement which, when executed, implements the proposed data store structure upon approval of the proposed data store structure through the customer interface.

\* \* \* \* \*